(12) United States Patent
Roh

(10) Patent No.: US 11,346,935 B2
(45) Date of Patent: May 31, 2022

(54) VEHICLE RADAR CONTROL APPARATUS AND METHOD

(71) Applicant: Hyundai Mobis Co., Ltd., Seoul (KR)

(72) Inventor: Hee Chang Roh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 230 days.

(21) Appl. No.: 16/516,927

(22) Filed: Jul. 19, 2019

(65) Prior Publication Data

US 2020/0025910 A1    Jan. 23, 2020

(30) Foreign Application Priority Data

Jul. 20, 2018    (KR) ........................ 10-2018-0084570

(51) Int. Cl.
*G01S 13/86*    (2006.01)
*G01S 13/931*   (2020.01)
*G01S 13/00*    (2006.01)

(52) U.S. Cl.
CPC .......... *G01S 13/867* (2013.01); *G01S 13/931* (2013.01)

(58) Field of Classification Search
CPC .................................................. G01C 21/362
See application file for complete search history.

(56) References Cited

U.S. PATENT DOCUMENTS

| | | | |
|---|---|---|---|
| 5,699,149 A | 12/1997 | Kuroda et al. | |
| 7,613,568 B2 * | 11/2009 | Kawasaki | G01S 13/867 701/301 |
| 8,466,806 B2 * | 6/2013 | Schofield | G01S 13/931 340/903 |
| 9,939,523 B2 * | 4/2018 | Jin | G01S 13/931 |
| 10,222,803 B2 * | 3/2019 | Prasad | G01S 13/931 |
| 2003/0105578 A1 * | 6/2003 | Takenaga | B60W 30/16 701/117 |
| 2004/0167717 A1 * | 8/2004 | Buchanan | G01S 13/867 701/301 |
| 2006/0038885 A1 * | 2/2006 | Eggers | G01S 17/931 348/135 |
| 2010/0007728 A1 * | 1/2010 | Strauss | G01S 13/867 348/118 |
| 2014/0306844 A1 * | 10/2014 | Kim | G01S 13/867 342/385 |
| 2015/0293216 A1 * | 10/2015 | O'Dea | G01S 13/931 701/23 |

FOREIGN PATENT DOCUMENTS

KR    10-0352423    3/2006

* cited by examiner

*Primary Examiner* — Bernarr E Gregory
(74) *Attorney, Agent, or Firm* — H.C. Park & Associates, PLC

(57) ABSTRACT

A vehicle radar control apparatus may include: a camera configured to capture a forward image in a traveling direction of a traveling vehicle; one or more radar sensors each configured to irradiate a radar signal from the traveling vehicle, and receive a radar signal reflected and returned from the neighboring vehicle; and a control unit configured to generate traveling information including one or more of distance, direction and speed of the traveling vehicle with respect to the neighboring vehicle by analyzing the forward image captured by the camera and the radar signal received by the radar sensor.

12 Claims, 6 Drawing Sheets

VEHICLE RADAR CONTROL APPARATUS AND METHOD

CROSS-REFERENCES TO RELATED APPLICATIONS

This application claims priority from and the benefit of Korean Patent Application No. 10-2018-0084570, filed on Jul. 20, 2018, which is hereby incorporated by reference for all purposes as if set forth herein.

BACKGROUND

Field

Exemplary embodiments relate to a vehicle radar control apparatus and method.

Discussion of the Background

For convenience of a driver who drives a vehicle, various devices are mounted in the vehicle. Examples of the various devices include a navigation system, a lane keeping assist system (LKAS), an automatic parking system, a rear view camera and the like. Among the devices, the navigation system senses the current location of the vehicle using a GPS receiver or the like, and guides the driver through the optimal route from the current location to the destination. The LKAS serves to recognize a lane colored in white or yellow using an internal camera of the vehicle, determine whether the driver's vehicle departs from the lane, and inform the driver of the determination result.

In general, when the vehicle travels on the first lane or the rightmost lane of a road with no sidewalk, a radar sensor does not need to sense the left side of the first lane or the right side of the rightmost lane. When the vehicle travels along a guard rail or through a tunnel, the radar sensor needs to perform computation on the structure which successively appears, thereby resulting in a considerable amount of unnecessary computation. In addition, when the vehicle travels on the rightmost lane of a city street with a sidewalk, it is necessary to monitor the sidewalk because the driver does know when a pedestrian will appear on the road.

The related art is technical information which the present inventor has retained to derive the present invention or has acquired during the process of deriving the present invention. The related art is not necessarily a publicly known technique which is published to the public before the application of the present invention.

RELATED ART DOCUMENT

Patent Document (Patent Document 1) Korean Patent No. 10-0352423

The above information disclosed in this Background section is only for enhancement of understanding of the background of the invention and, therefore, it may contain information that does not constitute prior art.

SUMMARY

Exemplary embodiments of the present invention are directed to a vehicle radar control apparatus and method which can distinguish an area where computation is not necessary, using a radar sensor, during driving, and reduce the amount of computation required for sensing a vehicle by removing sensing data inputted from the radar sensor in the area where computation is not necessary.

Embodiments of the present invention are directed to a vehicle radar control apparatus and method which can adjust a sensing threshold value of a radar sensor to improve the probability that an object moving on a sidewalk will be sensed, thereby preventing an accident in advance.

In one embodiment, a vehicle radar control apparatus may include: a camera configured to capture a forward image in a traveling direction of a traveling vehicle; one or more radar sensors each configured to irradiate a radar signal from the traveling vehicle, and receive a radar signal reflected and returned from the neighboring vehicle; and a control unit configured to generate traveling information including one or more of distance, direction and speed of the traveling vehicle with respect to the neighboring vehicle by analyzing the forward image captured by the camera and the radar signal received by the radar sensor. The control unit may include: a lane determination unit configured to determine whether a section located in one or more of a first direction and a second direction of the traveling vehicle is a lane section or a non-lane section, using navigation information and map information; and a signal processing unit configured to remove the radar signal received by the radar sensor for the non-lane section and generate the traveling information, when a section located in the first direction of the traveling vehicle is the non-lane section.

The signal processing unit may remove the radar signal received by the radar sensor for the non-lane section and generates the traveling information, when a section located in the second direction of the vehicle traveling on an expressway is the non-lane section, and analyze the radar signal received by the radar sensor and generates the traveling information, when a section located in the second direction of the vehicle traveling on a general road is the non-lane section.

The control unit may further include a threshold value adjusting unit configured to adjust a sensing threshold value as irradiation intensity and received signal strength indication of the radar sensor, for the non-lane section located in the second direction of the vehicle traveling on a general road. The signal processing unit may analyze the radar sensor received by the radar sensor of which the sensing threshold value is adjusted, and determine whether a moving object is present.

The control unit may further include a reliability determination unit configured to determine whether the total number of lanes included in the forward image captured by the camera is equal to the total number of lanes included in the map information, and update the map information using the navigation information when the total number of lanes included in the forward image captured by the camera is different from the total number of lanes included in the map information.

The control unit may further include a reliability determination unit configured to update the map information using the navigation information, when the relative speed of the neighboring vehicle located in the first direction of the traveling vehicle is equal or less than a threshold value in a state where it is determined that the first direction of the traveling vehicle is the non-lane direction after the radar signal received by the radar sensor is analyzed to determine the relative speed of the traveling vehicle with respect to the neighboring vehicle.

The reliability determination unit may update the map information using the navigation information, when a moving target is sensed in the second direction of the traveling vehicle for a threshold time or more in a state where it is determined that a section located in the second direction of the traveling vehicle is the non-lane section.

In another embodiment, a vehicle radar control method may include: capturing, by a camera, a forward image in a traveling direction of a traveling vehicle; irradiating, by one or more radar sensors, a radar signal from the traveling vehicle, and receiving a radar signal reflected and returned from the neighboring vehicle; and generating, by a control unit, traveling information including one or more of distance, direction and speed of the traveling vehicle with respect to the neighboring vehicle by analyzing the forward image captured by the camera and the radar signal received by the radar sensor. The generating of the traveling information may include: determining whether a section located in one or more of a first direction and a second direction of the traveling vehicle is a lane section or a non-lane section, using navigation information and map information; and removing the radar signal received by the radar sensor for the non-lane section and generating the traveling information, when a section located in the first direction of the traveling vehicle is the non-lane section.

The vehicle radar control method may further include: removing the radar signal received by the radar sensor for the non-lane section and generating the traveling information, when a section located in the second direction of the vehicle traveling on an expressway is the non-lane section; and generating the traveling information by analyzing the radar signal received by the radar sensor, when a section located in the second direction of the vehicle traveling on a general road is the non-lane section.

The vehicle radar control method may further include: adjusting, by the control unit, a sensing threshold value as irradiation intensity and received signal strength indication of the radar sensor for the non-lane section located in the second direction of the vehicle traveling on a general road; and analyzing, by the control unit, the radar signal received by the radar sensor of which the sensing threshold value is adjusted, and determining whether a moving object is present.

The vehicle radar control method may further include: determining, by the control unit, whether the total number of lanes included in the forward image captured by the camera is equal to the total number of lanes included in the map information; and updating, by the control unit, the map information using the navigation information, when the total number of lanes included in the forward image is different from the total number of lanes included in the map information.

The vehicle radar control method may further include: analyzing, by the control unit, the radar signal received by the radar sensor, and determining the relative speed of the traveling vehicle with respect to the neighboring vehicle; and updating, by the control unit, the map information using the navigation information, when the relative speed of the neighboring vehicle located in the first direction of the traveling vehicle is equal to or less than a threshold value in a state where it is determined that a section located in the first direction of the traveling vehicle is the non-lane section.

The vehicle radar control method may further include updating, by the control unit, the map information using the navigation information, when a moving target is sensed in the second direction of the traveling vehicle for a threshold time or more in a state where it is determined that a section located in the second direction of the traveling vehicle is the non-lane section.

In another embodiment, another method and system for embodying the present invention and a computer program for executing the method may be further provided.

In accordance with the embodiments of the present invention, the vehicle radar control apparatus and method can distinguish an area where computation is not necessary, using a radar sensor, during driving, and reduce the amount of computation required for sensing a vehicle by removing sensing data inputted from the radar sensor in the area where computation is not necessary.

Furthermore, the vehicle radar control apparatus and method can adjust a sensing threshold value of a radar sensor to improve the probability that an object moving on a sidewalk will be sensed, thereby preventing an accident in advance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENT

Figure 1:
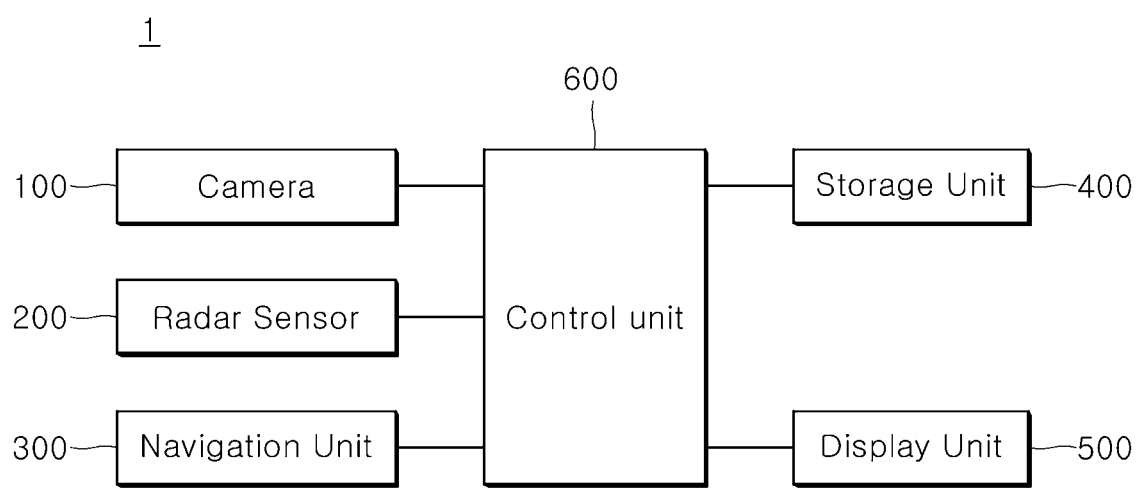
FIG. 1 is a diagram schematically illustrating a vehicle radar control apparatus in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The terms used in this application are only used to describe a specific embodiment, and not intended to limit the present invention. The terms of a singular form may include plural forms unless referred to the contrary. In this application, the term of "include" or "have" only specifies the presence of a property, number, step, operation, component, part or combinations thereof described in the specification, and does not exclude the presence or addition possibility of one or more other properties, numbers, steps, operations, components, parts or combinations thereof. The terms such as first and second may be used to describe various components, but the components should not be limited by the terms. The terms are used only to distinguish one component from another component.

Hereafter, embodiments of the present invention will be described in detail with reference to the accompanying drawings. In the following descriptions with reference to the accompanying drawings, the same or corresponding components will be denoted by like reference numerals, and the overlapping descriptions thereof will be omitted.

FIG. 1 is a diagram schematically illustrating a vehicle radar control apparatus 1 in accordance with an embodiment of the present invention. Referring to FIG. 1, the vehicle radar control apparatus 1 may include a camera 100, a radar sensor 200, a navigation unit 300, a storage unit 400, a display unit 500 and a control unit 600.

The camera 100 may capture a forward image in the traveling direction of a traveling vehicle under control of the control unit 600. The camera 100 may capture the forward image in the traveling direction of the vehicle using a COMS (Complementary Metal-Oxide Semiconductor) module (not illustrated) or CCD (Charge Coupled Device) module (not illustrated). The camera 100 may include an image signal processing unit (not illustrated) which can reduce noise of captured image frames and perform image signal processing for image quality enhancement, such as gamma correction, color filter array interpolation, color matrix, color correction or color enhancement. The image signal processing unit may functionally perform color processing, blur processing, edge emphasis processing, image analysis processing, image recognition processing, image effect processing and the like. The image recognition processing may include face recognition processing, scene recognition processing and the like. For example, the image signal processing unit may perform luminance level adjustment, color correction, contrast adjustment, contour emphasis adjustment, screen split, character image generation, image synthesis and the like.

The radar sensor 200 may sense an obstacle located at the front/rear of the traveling vehicle, irradiate a radar signal from the front/rear of the traveling vehicle, and receive the radar signal reflected and returned from the obstacle. The vehicle may include one or more radar sensors 200 mounted thereon. The obstacle may include a neighboring vehicle traveling around the traveling vehicle and a moving object (human, animal or the like) around a lane.

In an embodiment, among the one or more radar sensors 200, the radar sensor 200 mounted at the front left of the vehicle may sense an obstacle located at the front left of the vehicle, the radar sensor 200 mounted at the front right of the vehicle may sense an obstacle located at the front right of the vehicle, the radar sensor 200 mounted at the rear left of the vehicle may sense an obstacle located at the rear left of the vehicle, and the radar sensor 200 mounted at the rear right of the vehicle may sense an obstacle located at the rear right of the vehicle.

Since the radar sensor 200 has a wide and long sensing region, the radar signal received by the radar sensor 200 may be analyzed to measure a distance to an obstacle located at a long distance, the relative speed of the obstacle (the speed of the obstacle with respect to the speed of the ego vehicle), and the location of the obstacle.

The navigation unit 300 may perform various functions of matching map information stored in the storage unit 400 with the location of the vehicle on the map, using the GPS, and showing the way according to a destination or stopover set by a passenger. The navigation unit 300 may output navigation information to the display unit 500 in response to the destination setting by the driver. The navigation information may include one or more pieces of information among route guidance direction information, possible driving direction information for each lane and total lane number information. As long as the navigation unit 300 can provide information on the relationship between the vehicle location and the destination (stopover), the navigation unit 300 is not limited to a specific form and shape. Thus, the detailed descriptions of an implementation method of the navigation unit 300 will be omitted herein. The navigation unit 300 may update the map information stored in the storage unit 400 according to a request of the control unit 600.

The display unit 500 may display the map information while interworking with the navigation unit 300 and the storage unit 400, and display the location of the traveling vehicle on the map information and the navigation information through a visual or auditory method.

The control unit 600 may analyze the forward image captured by the camera 100 and the radar signal received by the radar sensor 200, and generate traveling information including one or more of the distance, direction and speed of the traveling vehicle with respect to an obstacle, for example, a neighboring vehicle.

Figure 2:
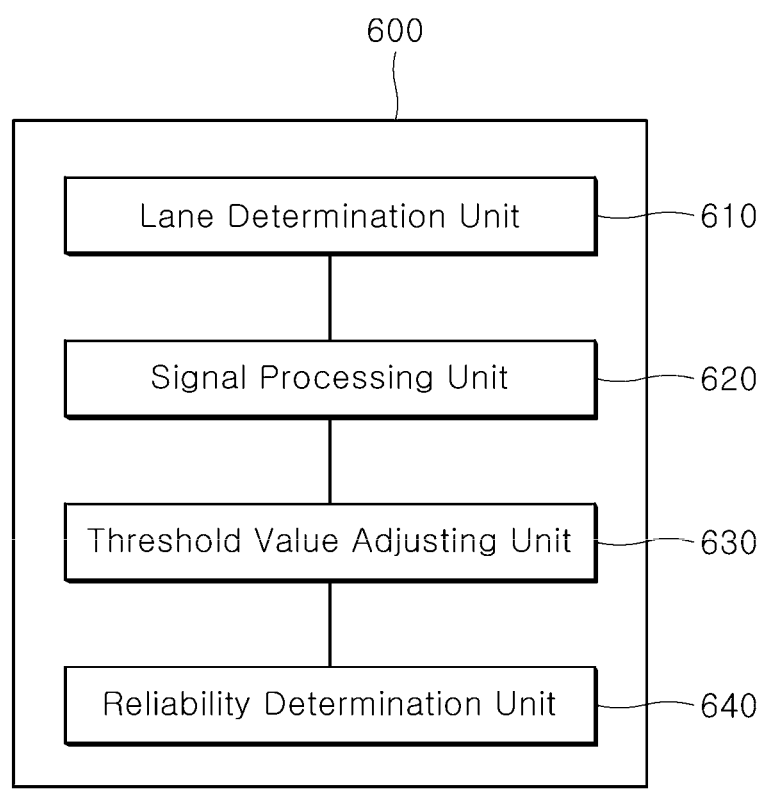
FIG. 2 is a diagram schematically illustrating a detailed configuration of a control unit in the vehicle radar control apparatus in FIG. 1.
Figure 3A:
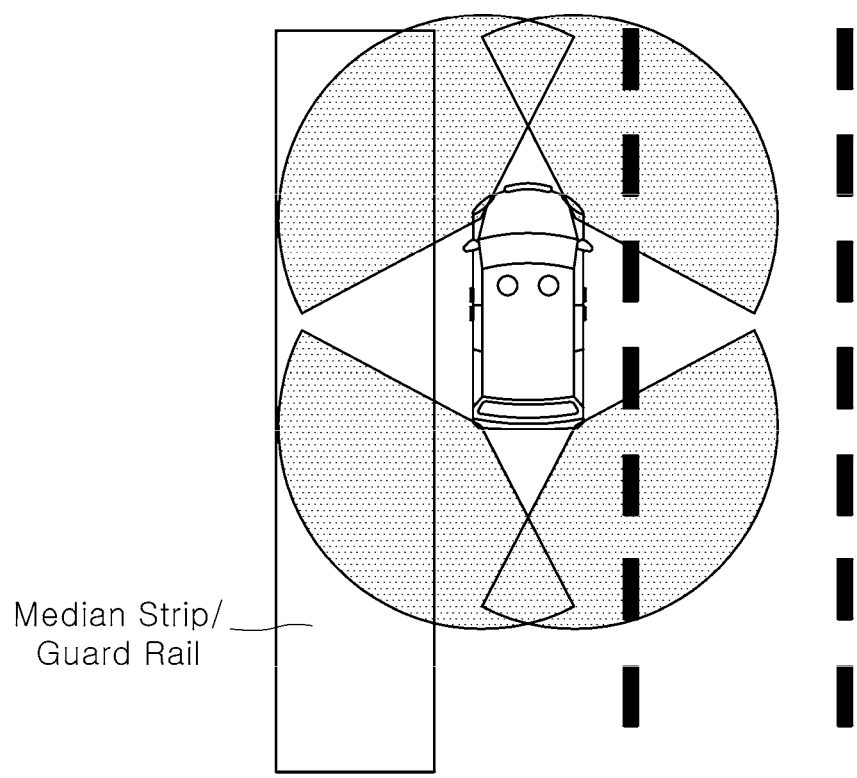
FIGS. 3A and 3B are diagrams illustrating sensing ranges of radar sensors which are installed in a traveling vehicle and included in the vehicle radar control apparatus in FIG. 1.
Figure 3B:
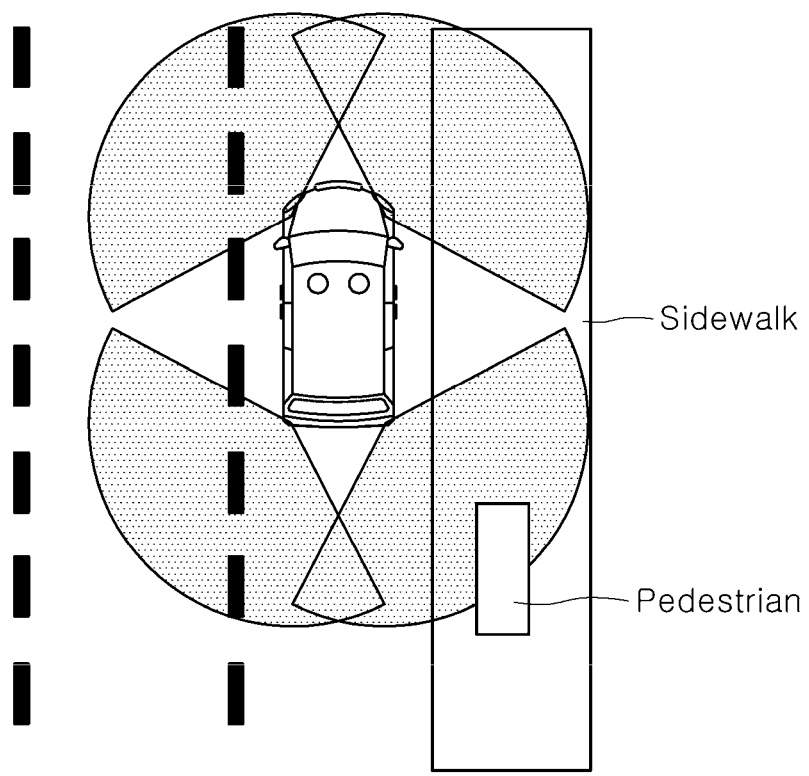

FIG. 2 is a diagram schematically illustrating a detailed configuration of the control unit in the vehicle radar control apparatus in FIG. 1, and FIGS. 3A and 3B are diagrams illustrating sensing ranges of the radar sensors which are installed in the traveling vehicle and included in the vehicle radar control apparatus in FIG. 1. Referring to FIG. 2, the control unit 600 may include a lane determination unit 610, a signal processing unit 620, a threshold value adjusting unit 630 and a reliability determination unit 640.

The lane determination unit 610 may determine whether a section located in one or more of first and second directions of the traveling vehicle is a lane section or non-lane section, using the navigation information and the map information. The first direction may correspond to the left of the traveling vehicle, and the second direction may correspond to the right of the traveling vehicle. In the present embodiment, the vehicle may be traveling on any one of an expressway and a general road, and the non-lane section may include a section where a median strip on the left of the first lane is located and/or a section where a shoulder on the left of the last lane is located, when the vehicle travels on the expressway. Furthermore, the non-lane section may include a section where a guard rail on the left of the first lane is located and/or a section where a sidewalk on the right of the last lane is located, when the vehicle travels on the general road.

When a section located in the first direction of the vehicle traveling on the expressway and/or the general road is the non-lane section, the signal processing unit 620 may remove a radar signal received by the radar sensor for the non-lane section, and generate traveling information. As illustrated in FIG. 3A, no vehicles may be present in the non-lane section located in the first direction of the vehicle traveling on the expressway and/or the general road. Therefore, the signal processing unit 620 does not need to generate traveling information, and thus may remove the radar signal for the non-lane section, among the radar signals received from the radar sensor 200, which makes it possible to reduce the amount of computation required for the signal processing unit 620 to generate traveling information.

When a section located in the second direction of the vehicle traveling on the expressway is the non-lane section, the signal processing unit 620 may remove the radar signal received by the radar sensor 200 for the non-lane section, and generate traveling information. When a section located in the second direction of the vehicle traveling on the general road is the non-lane section, the signal processing unit 620 may analyze the radar signal received by the radar sensor 200, and generate traveling information.

As illustrated in FIG. 3B, the non-lane section located in the second direction of the vehicle traveling on the general road may include a sidewalk. Thus, since a moving object may be present on the sidewalk, a traffic accident may occur unless the signal processing unit 620 analyzes the radar signal received from the radar sensor 200 and generates traveling information. In this case, the threshold value adjusting unit 630 may lower a sensing threshold value for the non-lane section (sidewalk section) located in the second direction of the vehicle traveling on the general road, the sensing threshold value being set for the irradiation intensity and received signal strength indication of the radar sensor 200. When the sensing threshold value of the radar sensor 200 is lowered, it may indicate that the lower the sensing threshold value, the higher the probability that a moving object will be present, when the signal processing unit 620 analyzes the radar signal received from the radar sensor 200 and determines whether a moving object is present.

In directions other than the first and second directions of the traveling vehicle, the signal processing unit 620 may analyze radar signals received from the radar sensor 200 and generate traveling information.

In an additional embodiment, since the non-lane section located in the second direction of the vehicle traveling on the expressway includes the shoulder, an object and/or vehicle may be present. In this case, unless the signal processing unit 620 analyzes the radar signal received from the radar sensor 200 and generates traveling information, a traffic accident may also occur. In this case, the threshold value adjusting unit 630 may lower a sensing threshold value for the non-lane section (shoulder section) located in the second direction of the vehicle traveling on the expressway, the sensing threshold value being set for the irradiation intensity and received signal strength indication of the radar sensor 200. When the sensing threshold value of the radar sensor 200 is lowered, it may indicate that the lower the threshold value, the higher the probability that an object and/or another vehicle will be present, when the signal processing unit 620 analyzes the radar signal received from the radar sensor 200 and determines whether an object and/or another vehicle is present.

In the present embodiment, the control unit 600 may include the reliability determination unit 640. The reliability determination unit 640 may determine lane reliability indicating whether an actual lane where the traveling vehicle is located coincides with a lane where the vehicle displayed on the map information in connection with the navigation system is located. When the actual lane where the traveling vehicle is located does not coincide with the lane where the vehicle displayed on the map information is located, the reliability determination unit 640 may determine that the lane where the vehicle displayed on the map information is located is wrong, and update traveling lane information. The operation of the reliability determination unit 640 may be performed whenever the vehicle makes a lane change.

In a selective embodiment, the reliability determination unit 640 may determine whether the total number of lanes included in the forward image captured by the camera 100 is equal to the total number of lanes included in the map information displayed on the display unit 500, and update the map information using the navigation information, when the total number of lanes included in the forward image is different from the total number of lanes included in the map information. When the map information is updated, it may include updating lane information of the traveling vehicle.

In a selective embodiment, when the relative speed of the neighboring vehicle located in the first direction of the traveling vehicle is equal to or less than a threshold value in a state where it is determined that a section located in the first direction of the traveling vehicle is the non-lane section after the radar signal received by the radar sensor 200 is analyzed to determine the relative speed of the traveling vehicle with respect to the neighboring vehicle, the reliability determination unit 640 may update the map information using the navigation information. When the map information is updated, it may include updating the lane information of the traveling vehicle.

In a selective embodiment, when a moving target is sensed in the second direction of the traveling vehicle for a threshold time or more in a state where it is determined that a section located in the second direction of the traveling vehicle is the non-lane section, the reliability determination unit 640 may update the map information using the navigation information. When the map information is updated, it may include updating the lane information of the traveling vehicle.

In a selective embodiment, the reliability determination unit 640 may analyze the radar signal received by the radar sensor 200, and display the location (lane location) of the traveling vehicle and the location of a neighboring vehicle on the map information displayed on the display unit 500 at the same time, when a change between first and second time positions of the neighboring vehicle is equal to or more than a threshold value. In a selective embodiment, the reliability determination unit 640 may analyze the radar signal received by the radar sensor 200, and display the location (lane location) of the traveling vehicle and the location of the neighboring vehicle on the map information displayed on the display unit 500 at the same time, even when the relative acceleration of the neighboring vehicle is equal to or more than a threshold value.

Figure 4:
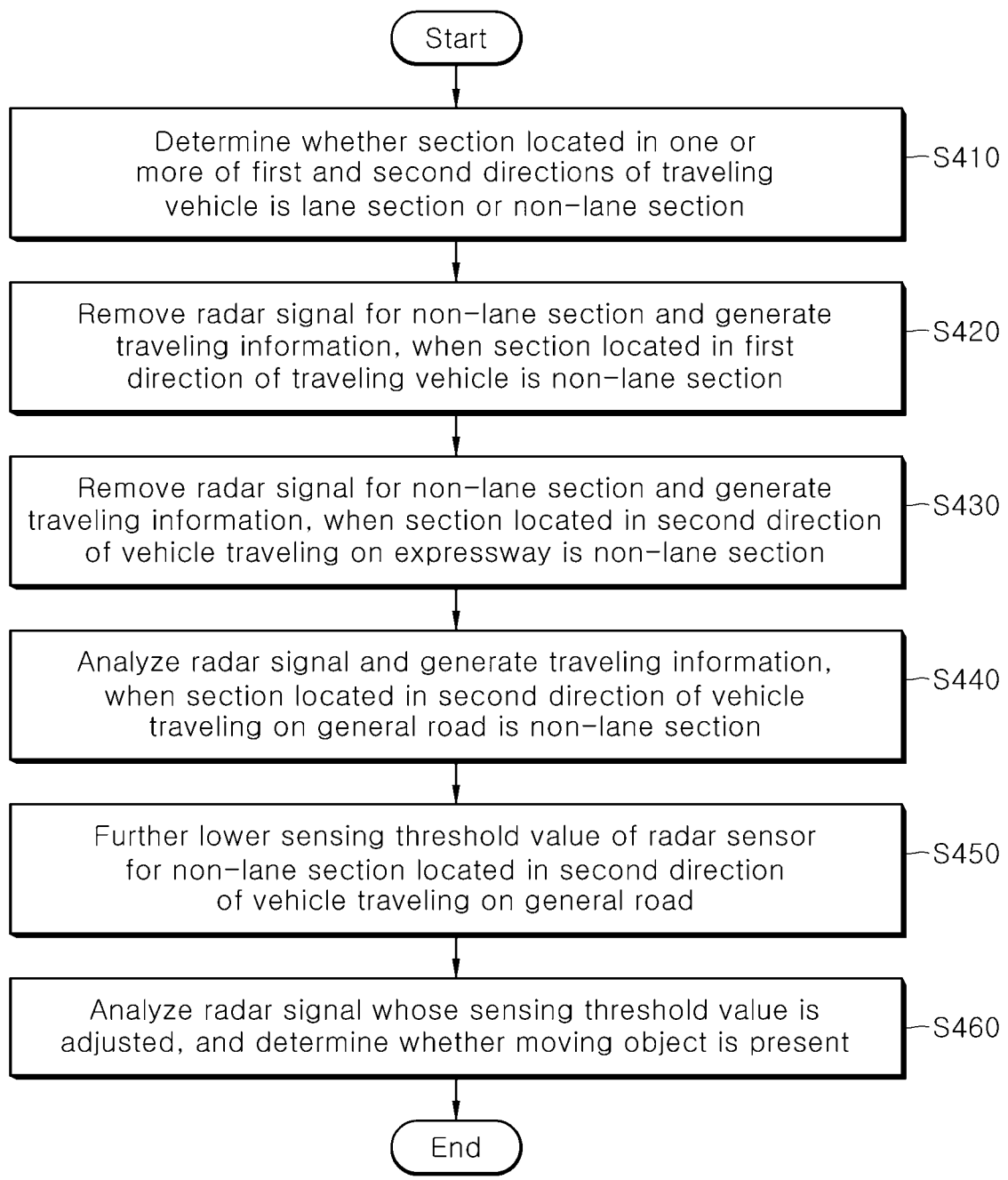
FIGS. 4 and 5 are flowchart illustrating a vehicle radar control method in accordance with an embodiment of the present invention.
Figure 5:
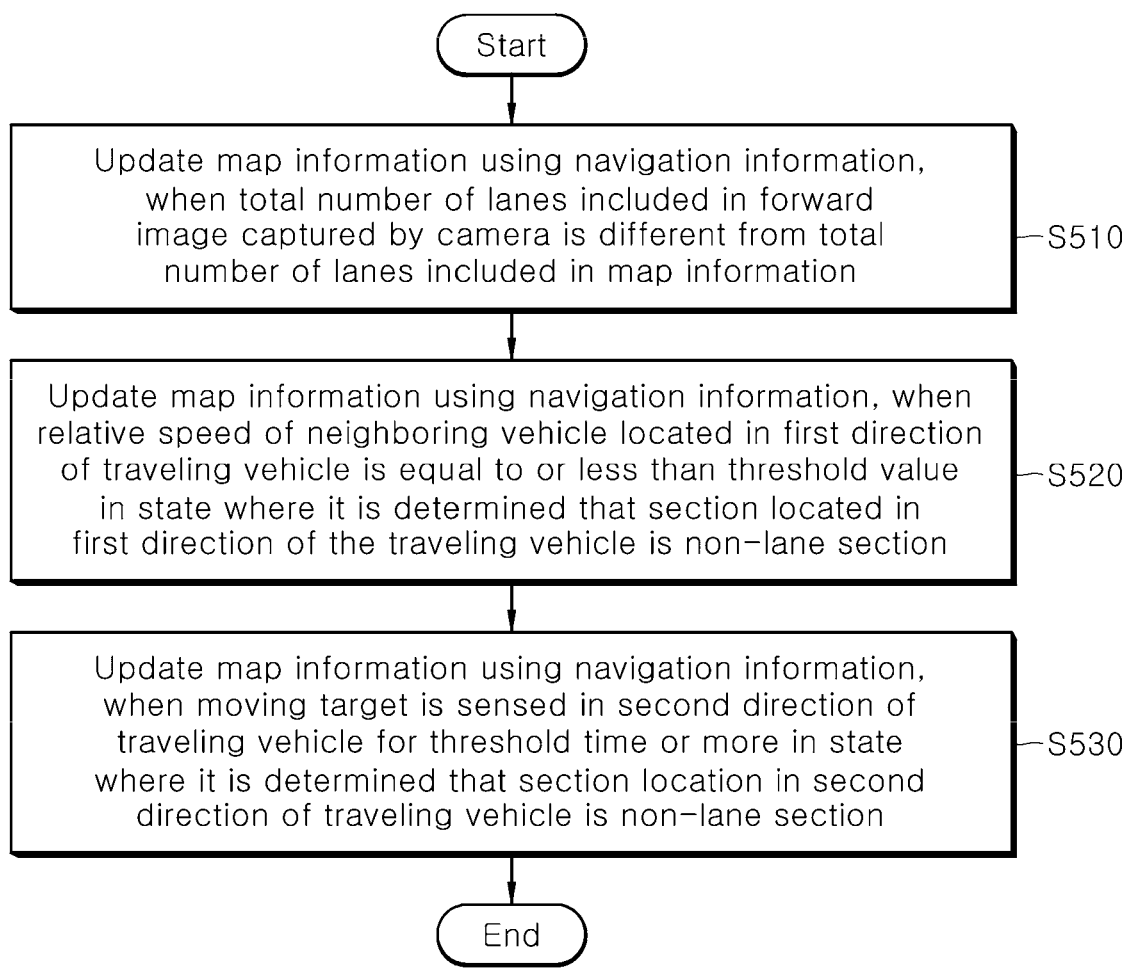

FIGS. 4 and 5 are flowchart illustrating a vehicle radar control method in accordance with an embodiment of the present invention. Hereafter, the descriptions of portions overlapping the descriptions of FIGS. 1 to 3 will be omitted herein.

Referring to FIG. 4, the vehicle radar control apparatus 1 may determine whether a section located in one or more of the first and second directions of the traveling vehicle is the lane section or the non-lane section, using navigation information and map information, in step S410. The first direction may correspond to the left of the traveling vehicle, and the second direction may correspond to the right of the traveling vehicle. In the present embodiment, the vehicle may be traveling on any one of an expressway and a general road, and the non-lane section may include a section where a median strip on the left of the first lane is located and/or a section where a shoulder on the left of the last lane is located, when the vehicle travels on the expressway. Furthermore, the non-lane section may include a section where a guard rail on the left of the first lane is located and/or a section where a sidewalk on the right of the last lane is located, when the vehicle travels on the general road.

In step S420, when a section located in the first direction of the vehicle traveling on the expressway and/or the general road is the non-lane section, the vehicle radar control apparatus 1 may remove a radar signal received by the radar sensor 200 for the non-lane section, and generate traveling information. Since no vehicles are present in the non-lane section located in the first direction of the vehicle traveling on the expressway and/or the general road, the vehicle radar control apparatus 1 does not need to generate traveling information. Therefore, the vehicle radar control apparatus 1 may remove the radar signal for the non-lane section, among the radar signals received from the radar sensor 200, which makes it possible to reduce the amount of computation required for the vehicle radar control apparatus 1 to generate traveling information.

In step S430, when a section located in the second direction of the vehicle traveling on the expressway is the non-lane section, the vehicle radar control apparatus 1 may remove the radar signal received by the radar sensor 200 for the non-lane section, and generate traveling information.

In step S440, when a section located in the second direction of the vehicle traveling on the general road is the non-lane section, the vehicle radar control apparatus 1 may analyze the radar signal received by the radar sensor 200, and generate traveling information. Since the non-lane section located in the second direction of the vehicle traveling on the general road includes a sidewalk, a moving object may be present on the sidewalk. Thus, unless the vehicle radar control apparatus 1 analyzes the radar signal received from the radar sensor 200 and generates the traveling information, a traffic accident may occur. Therefore, the vehicle radar control apparatus 1 needs to analyze the radar signal received by the radar sensor 200, and generate traveling information.

In step S450, the vehicle radar control apparatus 1 may further lower a sensing threshold value for the non-lane section (sidewalk section) located in the second direction of the vehicle traveling on the general road, the sensing threshold value being set for the irradiation intensity and received signal strength indication of the radar sensor 200. When the sensing threshold value of the radar sensor 200 is lowered, it may indicate that the lower the sensing threshold value, the higher the probability that a moving object will be present, when the vehicle radar control apparatus 1 analyzes the radar signal received from the radar sensor 200 and determines whether a moving object is present.

In step S460, the vehicle radar control apparatus 1 may analyze the radar signal received by the radar sensor 200 after the sensing threshold value is adjusted, and determine whether a moving object is present.

In an additional embodiment, since the non-lane section located in the second direction of the vehicle traveling on the expressway includes the shoulder, an object and/or vehicle may be present. In this case, unless the vehicle radar control apparatus 1 analyzes the radar signal received from the radar sensor 200 and generates traveling information, a traffic accident may also occur. In this case, the vehicle radar control apparatus 1 may lower the sensing threshold value for the non-lane section (shoulder section) located in the second direction of the vehicle traveling on the expressway, the sensing threshold value being set for the irradiation intensity and received signal strength indication of the radar sensor 200. When the sensing threshold value of the radar sensor 200 is lowered, it may indicate that the lower the threshold value, the higher the probability that an object and/or another vehicle will be present, when the vehicle radar control apparatus 1 analyzes the radar signal received from the radar sensor 200 and determines whether an object and/or another vehicle are present.

FIG. 5 is a flowchart for describing a method for updating lane information through reliability determination in the vehicle radar control method in accordance with the embodiment of the present invention. Hereafter, the descriptions of portions overlapping the descriptions of FIGS. 1 to 4 will be omitted herein.

Referring to FIG. 5, the vehicle radar control apparatus 1 may determine whether the total number of lanes included in the forward image captured by the camera 100 is equal to the total number of lanes included in the map information displayed on the display unit 500, and update the map information using the navigation information, when the total number of lanes included in the forward image is different from the total number of lanes included in the map information, in step S510. When the map information is updated, it may include updating the lane information of the traveling vehicle.

In step S520, when the relative speed of the neighboring vehicle located in the first direction of the traveling vehicle is equal to or less than a threshold value in a state where it is determined that a section located in the first direction of the traveling vehicle is the non-lane section after the radar signal received by the radar sensor 200 is analyzed to determine the relative speed of the traveling vehicle with respect to the neighboring vehicle, the vehicle radar control apparatus 1 may update the map information using the navigation information. When the map information is updated, it may include updating the lane information of the traveling vehicle.

In step S530, when a moving target is sensed in the second direction of the traveling vehicle for a threshold time or more in a state where it is determined that a section location in the second direction of the traveling vehicle is the non-lane section, the vehicle radar control apparatus 1 may update the map information using the navigation information. When the map information is updated, it may include updating the lane information of the traveling vehicle.

In a selective embodiment, the vehicle radar control apparatus 1 may analyze the radar signal received by the radar sensor 200, and display the location (lane location) of the traveling vehicle and the location of the neighboring vehicle on the map information displayed on the display unit 500 at the same time, when a change between first and second time positions of the neighboring vehicle is equal to or more than a threshold value. In a selective embodiment, the vehicle radar control apparatus 1 may analyze the radar signal received by the radar sensor 200, and display the location (lane location) of the traveling vehicle and the location of the neighboring vehicle on the map information displayed on the display unit 500 at the same time, even when the relative acceleration of the neighboring vehicle is equal to or more than a threshold value.

The above-described embodiments of the present invention may be implemented in the form of computer programs which can be executed on a computer through various components, and the computer programs may be recorded in a computer readable medium. At this time, the medium may include a magnetic medium such as a hard disk, floppy disk or magnetic tape, an optical recording medium such as a CD-ROM or DVD, a magneto-optical medium such as a floptical disk, and a hardware device such as a ROM, RAM or flash memory, which is specifically configured to store and execute program commands.

The computer program may include an available program which is specifically designed and configured for the present invention, or publicly known to those skilled in the computer software field. Examples of the computer program may include high-level language codes which can be executed by a computer through an interpreter, as well as machine language codes which are generated by a compiler.

In the specification (or particularly the claims) of the present invention, the use of the term "the" and reference terms similar to "the" may correspond to both of a singular form and plural forms. Furthermore, when a range is described in the present invention, it may indicate that the present invention includes an invention to which individual values belonging to the range are applied (unless referred to the contrary), and the individual values constituting the range are described in the detailed descriptions of the invention.

The steps constituting the method in accordance with the embodiment of the present invention may be performed in suitable order, when the order of the steps is clearly specified or unless referred to the contrary. The present invention is not limited to the order of the steps. In the present invention, all examples or exemplary terms (for example, and the like) are simply used to describe the present invention in detail. The scope of the present invention is not limited by the examples or exemplary terms, as long as the scope of the present invention is not limited by the claims. Furthermore, it is obvious to a person skilled in the art that various modifications, combinations and changes can be made according to design conditions and factors within the scope of the claims or equivalents thereto.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A vehicle radar control apparatus comprising:
a camera configured to capture a forward image in a traveling direction of a vehicle;
one or more radar sensors each configured to irradiate a radar signal from the vehicle, and receive a radar signal reflected and returned from a neighboring vehicle; and
a controller configured to generate traveling information including one or more of distance, direction and speed of the vehicle with respect to the neighboring vehicle by analyzing the forward image captured by the camera and the radar signal received by the radar sensor,
wherein the controller comprises:
a lane determiner configured to determine whether a section located in one or more of a first direction and a second direction of the vehicle is a lane section or a non-lane section, using navigation information and map information; and
a signal processor configured to remove the radar signal received by the radar sensor for the non-lane section and to generate the traveling information, when a section located in the first direction of the vehicle is the non-lane section.

2. The vehicle radar control apparatus of claim 1, wherein the signal processor is configured to remove the radar signal received by the radar sensor for the non-lane section and to generate the traveling information, when a section located in the second direction of the vehicle traveling on an expressway is the non-lane section, and to analyze the radar signal received by the radar sensor and to generate the traveling information, when a section located in the second direction of the vehicle traveling on a general road is the non-lane section.

3. The vehicle radar control apparatus of claim 1, wherein the controller further comprises a threshold value adjuster configured to adjust a sensing threshold value as irradiation intensity and received signal strength indication of the radar sensor, for the non-lane section located in the second direction of the vehicle traveling on a general road,
wherein the signal processor is configured to analyze the radar sensor received by the radar sensor of which the sensing threshold value is adjusted, and to determine whether a moving object is present.

4. The vehicle radar control apparatus of claim 1, wherein the controller further comprises a reliability determiner configured to determine whether a total number of lanes included in the forward image captured by the camera is equal to a total number of lanes included in the map information, and to update the map information using the navigation information when the total number of lanes included in the forward image captured by the camera is different from the total number of lanes included in the map information.

5. The vehicle radar control apparatus of claim 1, wherein the controller further comprises a reliability determiner configured to update the map information using the navigation information, when a relative speed of the neighboring vehicle located in the first direction of the vehicle is equal or less than a threshold value in a state where it is determined that the first direction of the vehicle is a non-lane direction after the radar signal received by the radar sensor is analyzed to determine a relative speed of the vehicle with respect to the neighboring vehicle.

6. The vehicle radar control apparatus of claim 5, wherein the reliability determiner is configured to update the map information using the navigation information, when a moving target is sensed in the second direction of the vehicle for a threshold time or more in a state where it is determined that a section located in the second direction of the vehicle is the non-lane section.

7. A vehicle radar control method comprising the steps of:
capturing, by a camera, a forward image in a traveling direction of a vehicle;
irradiating, by one or more radar sensors, a radar signal from the vehicle, and receiving a radar signal reflected and returned from a neighboring vehicle; and
generating, by a controller, traveling information including one or more of distance, direction and speed of the vehicle with respect to the neighboring vehicle by analyzing the forward image captured by the camera and the radar signal received by the radar sensor,
wherein the step of generating of the traveling information comprises the steps of:
determining whether a section located in one or more of a first direction and a second direction of the vehicle is a lane section or a non-lane section, using navigation information and map information; and
removing the radar signal received by the radar sensor for the non-lane section and generating the traveling information, when a section located in the first direction of the vehicle is the non-lane section.

8. The vehicle radar control method of claim 7, further comprising the steps of:
removing the radar signal received by the radar sensor for the non-lane section and generating the traveling information, when a section located in the second direction of the vehicle traveling on an expressway is the non-lane section; and
generating the traveling information by analyzing the radar signal received by the radar sensor, when a section located in the second direction of the vehicle traveling on a general road is the non-lane section.

9. The vehicle radar control method of claim 7, further comprising the steps of:
adjusting, by the controller, a sensing threshold value as irradiation intensity and received signal strength indication of the radar sensor for the non-lane section located in the second direction of the vehicle traveling on a general road; and
analyzing, by the controller, the radar signal received by the radar sensor of which the sensing threshold value is adjusted, and determining whether a moving object is present.

10. The vehicle radar control method of claim 7, further comprising the steps of:
determining, by the controller, whether a total number of lanes included in the forward image captured by the camera is equal to a total number of lanes included in the map information; and
updating, by the controller, the map information using the navigation information, when the total number of lanes included in the forward image is different from the total number of lanes included in the map information.

11. The vehicle radar control method of claim 7, further comprising the steps of:
analyzing, by the controller, the radar signal received by the radar sensor, and determining a relative speed of the vehicle with respect to the neighboring vehicle; and
updating, by the controller, the map information using the navigation information, when the relative speed of the neighboring vehicle located in the first direction of the vehicle is equal to or less than a threshold value in a state where it is determined that a section located in the first direction of the vehicle is the non-lane section.

12. The vehicle radar control method of claim 11, further comprising the step of updating, by the controller, the map information using the navigation information, when a moving target is sensed in the second direction of the vehicle for a threshold time or more in a state where it is determined that a section located in the second direction of the vehicle is the non-lane section.

* * * * *